Sept. 26, 1950  T. W. GLYNN  2,523,566
GLASS ELECTRICAL HEATING PANEL
Filed Feb. 12, 1945

INVENTOR.
BY

Patented Sept. 26, 1950

2,523,566

UNITED STATES PATENT OFFICE 2,523,566

GLASS ELECTRICAL HEATING PANEL

Theodore W. Glynn, Kingsport, Tenn., assignor to Blue Ridge Glass Corporation, Kingsport, Tenn., a corporation of New York Application February 12, 1945, Serial No. 577,385

3 Claims. (Cl. 219—19)

It has been proposed to form a heating element by depositing on a plate of glass a thin layer of metal, current being passed through the layer to heat it and thus the plate on which it is deposited. Limitations on the heating capacity of such an element are imposed by the tendency of the glass to crack due to unequal heating of various areas of the plate. Moreover, for constructional reasons it is desirable that the conducting coating be only on the central parts of the plate, leaving marginal portions uncovered. This creates a temperature differential between different portions of the plate and results in cracking.

My invention involves in so proportioning the conductive capacity of the deposit at different portions of the plate that while the margin of the plate may be left uncovered, the margin is sufficiently heated to prevent or reduce the cracking before referred to. This may be accomplished by providing that the resistance of the conduction paths adjacent to the margin on the passage of the heating current are sufficiently higher than the resistance at medial portions of the conducting plate, thereby generating excess heat, which is imparted by conduction to the margins of the plate to such an extent that the marginal portions of the plate are heated to a higher temperature than the central portions thereof, which condition I have found is conducive to endurance.

Referring to the accompanying drawings in which corresponding parts are designated by corresponding marks of reference—

The glass plate A is of desired size and shape. It may be tempered glass or of a heat-resistant glass and/or it may be armored by wire embedded therein. If of tempered or heat-resistant glass, the thermal endurance of the element will be greater than that of ordinary glass; and if wired, a protection will be afforded against damage from pieces breaking off and falling. Likewise, the plate may be surface-finished in various ways: i. e., polished, ground, or sand blasted, and may, if desired, be corrugated on one or both sides. By preference, the plate is corrugated only on the side having the grid deposited thereon and is sand-blasted on such side.

By preference this element consists of a grid, the several bars of which are connected in series, located at the central portion of the plate, and conforming in exterior contour to that of the plate, the grid being surrounded by conducting strips, also connected in series with each other, and with the grid, the strips having higher resistance per unit of length than the bars of the grid.

Figure 1:
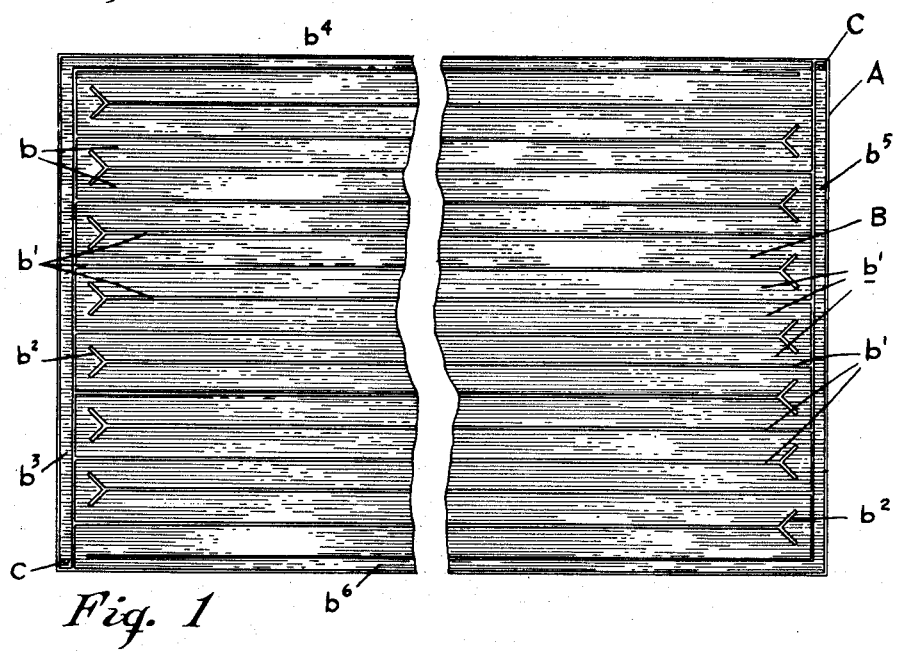
Figure 1 is a plan view of a glass heating panel having a conducting coating in accordance with my improved construction deposited thereon.

In Figure 1 one embodiment of this idea is shown. Here each of the bars $b$ of the grid B are connected at opposite ends with the ends of the bars on opposite sides thereof, but otherwise separated from each by narrow strips $b'$ of uncoated glass. The bars are relatively wide in respect to the strips, so that nearly all of the middle portion of the sheet is covered by the conducting bars, and is heated by the resistance of the bars to the passage of current thereto.

To prevent the drop of resistance of the conducting path at the point of connection of the adjacent convolutions, the non-conducting strips $b'$ at their ends are bifurcated as at $b^2$, such bifurcations serving by cutting down the conductive area to maintain a uniformity in resistance per unit length.

The grid, as before described, covers the central portion of the plate and surrounding it, and between it and the edges of the plate and adjacent to the latter are four conducting bands $b^3$, $b^4$, $b^5$, $b^6$ connected in series, such bands being shown as of less width than the width of the convolutions, thereby increasing the amount of heat developed per unit of length by the passage of the current therethrough; whereby there is imparted to the marginal portions of the plate the desired higher temperature.

The four bands are shown connected in series with each other and in series with the bars of the grid, two at one end of the series of bars and two at the other, the ends of such bands opposite such points of attachment being connected with the electrical terminals C.

Figure 2:
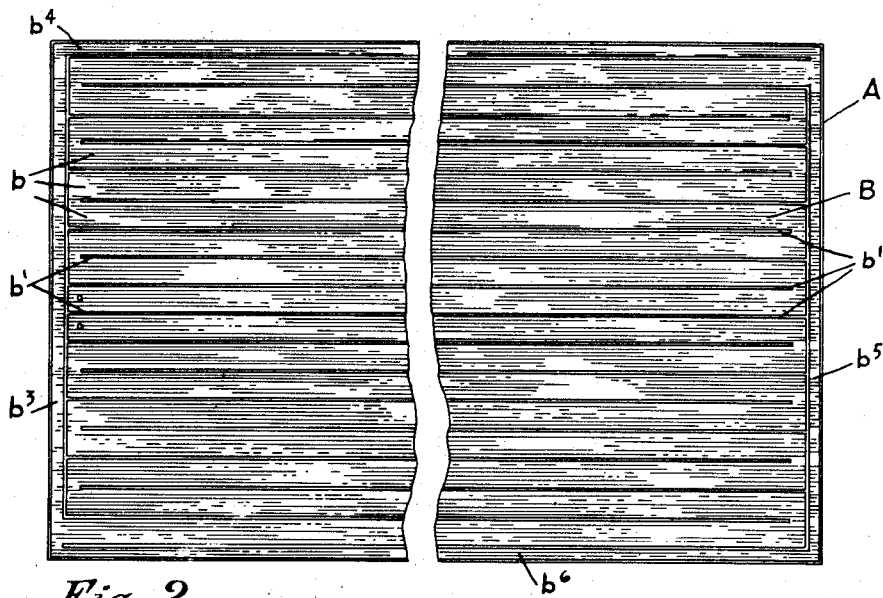
Figure 2 is a similar view of a modified form thereof.

The grid arrangement shown in Figure 2 is generally similar to that shown in Figure 1 except that in lieu of the bifurcations of $b^2$ the clear strips $b'$ between the bars extend further towards the ends of the grid formed by the bars, thereby decreasing the conductive area at the point of junction of the several bars.

While I have shown varying the width of the bands forming the conductive path as means for controlling the heat generated at the point of such variation, it will be obvious that other well known means for varying the resistance at selected points in the heating element; namely, thickness, composition, etc., may be employed in carrying out the broad idea of this invention, which is to prevent cracking by heating the marginal portions of the plate to or above the central portions thereof.

Having thus described my invention what I claim as new and desire to secure by United States Letters Patent, is:

1. A heating element comprising a glass plate having an electrical conductor deposited thereon and distributed over substantially the entire surface thereof, the resistance of the conductor per unit area of the plate covered thereby being greater adjacent to the margin of the plate than in the central portion thereof.

2. A heating element comprising a glass plate having deposited thereon a conductor formed by bars connected in series and distributed over substantially the entire surface thereof, the resistance of the conductor per unit area of the plate covered thereby being greater adjacent to the margin of the plate than in the central portion thereof.

3. A heating element consisting of a glass plate having on its central portion an adherent series of conducting strips forming a grid and a series of conducting bands between the grid and the margin of the plate, connected in series to a common source, the resistance of the bands per unit of length being greater than the corresponding resistance of the strips.

THEODORE W. GLYNN.

REFERENCES CITED

The following references are of record in the file of this patent:

UNITED STATES PATENTS

| Number | Name | Date |
|---|---|---|
| 842,849 | Anderson | Feb. 5, 1907 |
| 918,535 | Hadaway | Apr. 20, 1909 |
| 987,293 | Gale | Mar. 21, 1911 |
| 1,092,526 | Hassel et al. | Apr. 7, 1914 |
| 2,119,680 | Long | June 7, 1938 |
| 2,205,543 | Rideau et al. | June 25, 1940 |
| 2,236,172 | Gray | Mar. 25, 1941 |
| 2,297,540 | Driscoll | Sept. 29, 1942 |

FOREIGN PATENTS

| Number | Country | Date |
|---|---|---|
| 806,261 | France | Sept. 21, 1936 |